United States Patent Office 3,516,902
Patented June 23, 1970

3,516,902
SPHERULES OF 2-(N-MORPHOLINOTHIO) BENZOTHIAZOLE
Claude Bonneau, Villeneuve St. Georges, France, assignor to Rhone-Poulenc S.A., Paris, France, a French body corporate
No Drawing. Filed July 13, 1967, Ser. No. 653,013
Claims priority, application France, July 19, 1966, 69,918
Int. Cl. B32b 5/16
U.S. Cl. 161—168
2 Claims

ABSTRACT OF THE DISCLOSURE 2-(N-morpholinothio)benzothiazole, useful as a vulcanisation accelerator for elastomers, is made in a novel spherular form with rigid skin and friable core by granulation of the molten compound containing a small amount of volatile solvent.

---

The present invention relates to rubber adjuvants.

It is well known that products for the treatment of rubber, when in powder form, suffer from numerous disadvantages. Powdered products are awkward to handle, and some of them have a very pronounced tendency to block. Their apparent density is low and this results in a bulky pack for a limited weight. Furthermore these products dust, resulting in losses during handling and in dangers of atmospheric pollution.

Attempts have been made to improve the presentation of powder products, for example by adding paraffin oil to them, and attempts have also been made to overcome the disadvantages inherent in powders by agglomerating them, for example in the form of granules, pellets or flakes.

The various envisaged solutions are imperfect from certain points of view. The addition of oil does not facilitate handling and furthermore reduces the concentration of active product. The agglomerated forms, particularly granules, also, in the majority of cases, contain binders which reduce the concentration of active material. The use of these forms is not always satisfactory. Products in flake form do not generally dust and the concentration is preserved but their implementation can present risks.

In the case of 2-(N-morpholinothio)benzothiazole of formula:

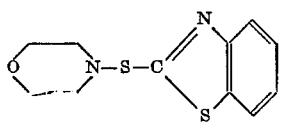

Various presentations are known, particularly powders and flakes, but their dispersion properties leave something to be desired.

It has now been found that using a process defined below, this compound can be obtained in a new non-powdering form which is easy to handle, which has a reduced tendency to block, and which can very easily be used. This new form consists of spherules, of 2-(N-morpholinothio)benzothiazole of mean diameter of between 0.1 and 5 mm., consisting of a rigid skin and a friable core, the weight ratio of rigid skin/friable core being between 0.5 and 0.01. These spherules are obtained by a process which comprises granulating molten 2-(N-morpholinothio)benzothiazole containing 1 to 10% by weight of an organic solvent therefor of boiling point below 60° C. in manner known per se. The amount of solvent contained in the molten product is preferably between 5 and 9% by weight. The solvent itself is preferably methylene chloride.

The spherules of the invention are particles in a spherical form or in an approximately spherical form such as an ovoid or ellipsoid. Their mean diameter is preferably between 0.8 and 2.5 mm. In general, the lower is the ratio of the skin to the core, the greater is the diameter of the spherules, and in practice it is advantageous to have as low a weight ratio of skin/core as possible, provided that the rigidity of the skin is sufficient for the spherules to be well preserved during handing.

The technique of granulation consists of projecting the molten product into a liquid which is practically a non-solvent therefor, which is kept stirred and which is at a temperature below the solidification temperature of the product, and of then filtering off and drying the resulting granules. Optimum conditions for obtaining the desired spherules can be found by experiment. Excessive agitation of the cooling liquid, or too great an interval between the temperature of the molten product and that of the cooling liquid can produce particles which are unusuable because they are too fine or above all because they consist entirely of hard material which is difficult to disperse in the elastomers which are to be treated. If the temperature interval between the molten product and the cooling liquid is too small, more or less coarse agglomerates of poor homogeneity are obtained.

Thus for example if spherules of 2-(N-morpholinothio)benzothiazole are to be produced from the molten product at 90–110° C. by granulation in stirred water, this water should be maintained at 45–60° C., with the stirring being controlled in accordance with the desired size of the spherules. The stirring should be the more vigorous, the smaller the spherules which one wishes to obtain. Very fine particles, which generally represent less than 10% of the entire weight, may, if desired, be removed by bolting and this small removed fraction may without disadvantage be recycled to the manufacture of the spherules.

The resulting spherules have good use characteristics in rubber mixtures, and particularly in synthetic elastomers of low internal viscosity, such as for example butadiene-styrene copolymers extended with oils, polybutadienes and synthetic polyisoprenes, which are well known for the difficulties which they present in the production of homogeneous mixtures.

The spherular product is of maximum concentration because it does not contain any diluent and it thus has the advantages of untreated powder products without their disadvantages. Furthermore the process for producing it is easily operated and economical.

The following examples illustrate the invention.

EXAMPLE 1

A solution of 60 g. of 2-(N-morpholinothio)benzothiazole in 100 cm.³ of methylene chloride is injected into an instantaneous evaporator of the tubular type, heated with steam. The heating of the evaporator is so controlled that the temperature of the fused product on issuing from the apparatus is between 95 and 100° C., which allows 6 to 7% of methylene chloride to be retained in the molten product. The evaporated methylene chloride is removed in a cyclone connected to the outlet of the evaporator, whilst the molten product is injected at the rate of 300 kg./hour into the granulation vat filled with water at 53° C.

A stream of water at 53° C. is simultaneously continuously introduced with stirring, at the rate of 1 m.³/hour into this cylindrical vat of 300 litres capacity, whose height is essentially equal to its diameter and which is provided with an internal rim, an overflow at half-height and a turbine-type stirrer, revolving at 700 r.p.m. at the bottom. The water temperature is maintained at essentially 53° C.

The spherules formed by solidification of the product in contact with the water are continuously carried away by the stream of water into a second-washing vat filled with water whose temperature is maintained at essentially 42° C., and are then filtered. The water is recycled to the granulation vat after having been reheated to 53° C.

350 kg./hour of a moist product containing about 14% of water are recovered on the filter and this is dried at 50° C. in a vacuum dryer (a ventilated dryer whose temperature does not exceed 60° C. may also be used).

Finally 300 kg./hour of dry 2-(N-morpholinothio)benzothiazole are obtained having the following properties: melting point 78–82° C.; benzothiazyl disulphide content, 0.4%; and spherule diameter, 0.8 to 2.5 mm. The yield in the process is quantitative.

The resulting product may, if desired, be bolted so as to remove the undesirable fine constituents from it, though this is not indispensable. In this case the fine granules which are removed are recycled to a point before the instantaneous evaporator.

EXAMPLE 2

This example shows the characteristics of employing the spherules obtained in Example 1, in comparison with the characteristics of products in powder and flake form.

A master mix containing 2-(N-morpholinothio)benzothiazole is prepared on a 150 mm. x 300 mm. roll mill with the following characteristics: roll temperature, 60° C.; roll gap, 0.5 mm.; and speeds of rotation, 19 and 26 r.p.m., under the following conditions.

180 grams of a butadiene-styrene copolymer extending with oil (commercially available under the name of Cariflex 1778) is introduced on to the rolls. After working for 2 minutes, which is necessary to form a hide, 10 grams of accelerator are added all at once, and a further 10 grams of accelerator are added all at once 45 seconds later.

Malaxating is continued for 5 minutes after introducing the second batch of accelerator. The ease of incorporation in this process, is defined as follows:

3—excellent, if the product is entirely incorporated in the rubber in less than 15 seconds after introducing the second accelerator batch.

2½—very good, if the product is entirely incorporated within a time between 15 seconds and 4 minutes.

2—good, if the product is entirely incorporated within a time between 4 and 5 minutes.

1—medium to poor, if a part of the product remains stuck to the rolls at the end of the experiment.

0—very poor if substantial encrustations remain stuck to the rolls at the end of the experiment.

The mixture is then "finished" (with a roll gap of 2 to 3/10 mm.). The distribution of the accelerator is observed visually and the number of granules visible in a 5 cm.-sided square is noted. The state of dispersion is the better, the smaller the number of points. The results observed are given in the table below:

| Product examined | Incorporation | Dispersion |
|---|---|---|
| Product of Example 1 (spherule diameter between 0.80 and 2.50 mm.) | 3 | 5 |
| Commercial product in powder form | 3 | 7 |
| Commercial product in flake form | 3 | 14 |

The results given in the table clearly show the excellent use characteristics of the sperular product of this invention.

I claim:

1. Spherules of 2-(N-morpholinothio)benzothiazole of mean diameter of between 0.1 and 5 mm., consisting of a rigid skin and a friable core, the weight ratio of rigid skin/friable core being between 0.5 and 0.001.

2. Spherules according to claim 1, having a mean diameter between 0.8 and 2.5 mm.

References Cited

UNITED STATES PATENTS 3,231,640   1/1966   Klopf _____ 264—13
3,231,641   1/1966   Edmunds _____ 264—13

WILLIAM J. VAN BALEN, Primary Examiner

U.S. Cl. X.R.

260—85.1; 264—13